United States Patent
Inoue et al.

(10) Patent No.: US 8,726,693 B2
(45) Date of Patent: May 20, 2014

(54) APPARATUS AND METHOD FOR SUPPLYING HYDROGEN GAS, AND QUARTZ GLASS MANUFACTURING APPARATUS

(75) Inventors: Dai Inoue, Ibaraki (JP); Takaaki Nagao, Ibaraki (JP); Hiroyuki Koide, Ibaraki (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 566 days.

(21) Appl. No.: 12/706,646

(22) Filed: Feb. 16, 2010

(65) Prior Publication Data
US 2010/0209859 A1   Aug. 19, 2010

(30) Foreign Application Priority Data
Feb. 18, 2009 (JP) ................................ 2009-035231

(51) Int. Cl.
F23N 1/00 (2006.01)
C03B 37/014 (2006.01)

(52) U.S. Cl.
CPC ............................. *C03B 37/01413* (2013.01)
USPC .............. 65/29.11; 65/29.12; 65/160; 65/413

(58) Field of Classification Search
CPC  C03B 37/01413; C03B 23/00; C03B 23/006; C03B 23/0086; C03B 23/0043; C03B 23/099; C03B 23/13; C03B 23/20; C03B 2207/36; C03B 2207/81; C03B 2211/40
USPC ............... 65/29.12, 29.11, 160, 413
See application file for complete search history.

(56) References Cited

U.S. PATENT DOCUMENTS

| 4,729,779 A * | 3/1988 | De Vasselot et al. ............. 65/84 |
| 2004/0030522 A1* | 2/2004 | Tison et al. ................... 702/100 |
| 2005/0109066 A1* | 5/2005 | Dabby et al. .................... 65/531 |

(Continued)

FOREIGN PATENT DOCUMENTS

| EP | 2 145 864 A2 | 1/2010 |
| JP | 2005-343714 A | 12/2005 |

(Continued)

OTHER PUBLICATIONS

European Search Report dated Feb. 14, 2012, in a counterpart European patent application No. 10001594.0.

*Primary Examiner* — Queenie Dehghan

(57) ABSTRACT

There is provided an apparatus for supplying a hydrogen gas to a quartz glass manufacturing apparatus including a burner that generates an oxyhydrogen flame when supplied with the hydrogen gas, where the apparatus includes: a first hydrogen supply system that supplies a hydrogen gas in which isomers are in equilibrium; a second hydrogen supply system that supplies a hydrogen gas in which isomers are out of equilibrium; a flow rate control section that includes: a valve that changes a flow rate of the hydrogen gas to be supplied to the burner; a first flow rate measuring section that measures the flow rate of the hydrogen gas to be supplied to the burner by measuring a heat capacity; and a control section that controls the valve in such a manner that a measured value obtained by the first flow rate measuring section approaches a set value input from outside; a second flow rate measuring section that measures the flow rate of the hydrogen gas to be supplied to the burner by measuring a different factor than the heat capacity; and a set value compensating section that compensates the set value by multiplying the set value by a ratio between the measured value obtained by the first flow rate measuring section and a measured value obtained by the second flow rate measuring section.

9 Claims, 8 Drawing Sheets

(56) References Cited

U.S. PATENT DOCUMENTS

2006/0123921 A1* 6/2006 Tison et al. .................... 73/861
2010/0011813 A1 1/2010 Inoue et al.

FOREIGN PATENT DOCUMENTS

| | | |
|---|---|---|
| JP | 2006-009917 A | 1/2006 |
| JP | 2010-24102 A | 2/2010 |

* cited by examiner

APPARATUS AND METHOD FOR SUPPLYING HYDROGEN GAS, AND QUARTZ GLASS MANUFACTURING APPARATUS

CROSS REFERENCE TO RELATED APPLICATION

The present application claims priority from a Japanese Patent Application No. 2009-035231 filed on Feb. 18, 2009, the contents of which are incorporated herein by reference.

BACKGROUND

1. Technical Field

The present invention relates to an apparatus and a method for supplying a hydrogen gas and to a quartz glass manufacturing apparatus.

2. Description of the Related Art

It is known to manufacture optical fiber base materials by using Vapor Phase Axial Deposition (VAD) method and Outside Vapor Deposition (OVD) method. Either method includes a step of generating and depositing silicon dioxide ($SiO_2$) through hydrolysis of a silicon compound such as silicon tetrachloride ($SiCl_4$) by means of an oxyhydrogen flame. Therefore, the above optical fiber base material manufacturing methods require continuous supply of a hydrogen gas.

A hydrogen gas for industrial use may be preserved in the liquid state for the purpose of reducing hydrogen embrittlement of the tank used for the preservation. Therefore, there is hydrogen supply equipment that heats and evaporates liquid hydrogen preserved in a low-temperature storage and supplies a resulting hydrogen gas.

The hydrogen gas used for manufacturing optical fiber base materials may be manufactured or preserved at ordinary temperatures, or may originate from liquid hydrogen preserved in the above-mentioned manner. Thus, there is also equipment that can switch the hydrogen gas supply source, for example, that uses a hydrogen gas manufactured and supplied at ordinary temperatures while temporarily using a hydrogen gas originating from liquid hydrogen.

Here, a hydrogen gas contains isomers, one of which is ortho-hydrogen and the other is para-hydrogen. The ortho-hydrogen and the para-hydrogen are in equilibrium at different content ratios between the isomers depending on the temperature of the hydrogen gas. Therefore, the content ratio between the ortho-hydrogen and the para-hydrogen differs between the hydrogen that is preserved at a low temperature in the liquid state and the hydrogen that is manufactured at ordinary temperatures.

In addition, the ortho-hydrogen and the para-hydrogen have different properties from each other. For example, there is a difference of approximately 6% in the constant pressure specific heat at 0 degrees Celsius. Therefore, a thermal type mass flow meter, which is frequently used as a hydrogen gas flow meter, indicates different measured values for same the flow rate between the ortho-hydrogen and the para-hydrogen, for example.

Japanese Patent Application Publication No. 2006-009917 discloses that a magnetic field may be applied to liquid hydrogen to prevent ortho-hydrogen from transforming into para-hydrogen. Japanese Patent Application No. 2008-187924 discloses a technique of calculating a factor for compensating a measured value of the flow rate of a hydrogen gas depending on the origin of the hydrogen gas, by obtaining in advance a measured value for the flow rate of a hydrogen gas originating from liquid hydrogen and a measured value for the flow rate of a hydrogen gas at ordinary temperatures.

However, the method based on the modification of a hydrogen gas through application of a magnetic field is only effective if the magnetic field is applied to all of the parts including the transport equipment and the supply equipment, in addition to the low-temperature storage. The method based on the calculation of the compensation factor is effective only when the hydrogen gas flowing through the mass flow meter is known to be one of the two types of hydrogen gases.

SUMMARY

Therefore, it is an object of an aspect of the innovations herein to provide an apparatus and a method for supplying a hydrogen gas and a quartz glass manufacturing method which are capable of overcoming the above drawbacks accompanying the related art. The above and other objects can be achieved by combinations described in the independent claims. The dependent claims define further advantageous and exemplary combinations of the innovations herein.

According to the first aspect related to the innovations herein, one exemplary apparatus for supplying a hydrogen gas to a quartz glass manufacturing apparatus including a burner that generates an oxyhydrogen flame when supplied with the hydrogen gas includes: a first hydrogen supply system that supplies a hydrogen gas in which isomers are in equilibrium; a second hydrogen supply system that supplies a hydrogen gas in which isomers are out of equilibrium; a flow rate control section that includes: a valve that changes a flow rate of the hydrogen gas to be supplied to the burner; a first flow rate measuring section that measures the flow rate of the hydrogen gas to be supplied to the burner by measuring a heat capacity; and a control section that controls the valve in such a manner that a measured value obtained by the first flow rate measuring section approaches a set value input from outside; a second flow rate measuring section that measures the flow rate of the hydrogen gas to be supplied to the burner by measuring a different factor than the heat capacity; and a set value compensating section that compensates the set value by multiplying the set value by a ratio between the measured value obtained by the first flow rate measuring section and a measured value obtained by the second flow rate measuring section.

According to the second aspect related to the innovations herein, one exemplary method for supplying, at a flow rate determined by a preset value, a hydrogen gas in which isomers are in equilibrium and a hydrogen gas in which isomers are out of equilibrium to a quartz glass manufacturing apparatus including a burner that generates an oxyhydrogen flame when supplied with a hydrogen gas includes: measuring a flow rate of the hydrogen gas to be supplied to the burner by measuring a heat capacity to obtain a first measured value; measuring the flow rate of the hydrogen gas to be supplied to the burner by measuring a different factor than the heat capacity to obtain a second measured value; compensating the preset value by multiplying the preset value by a ratio between the first measured value and the second measured value; and controlling opening of a valve that changes the flow rate of the hydrogen gas to be supplied to the burner in such a manner that the first measured value approaches the compensated preset value.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Some aspects of the invention will now be described based on the embodiments, which do not intend to limit the scope of the present invention, but exemplify the invention. All of the features and the combinations thereof described in the embodiment are not necessarily essential to the invention.

Figure 1:
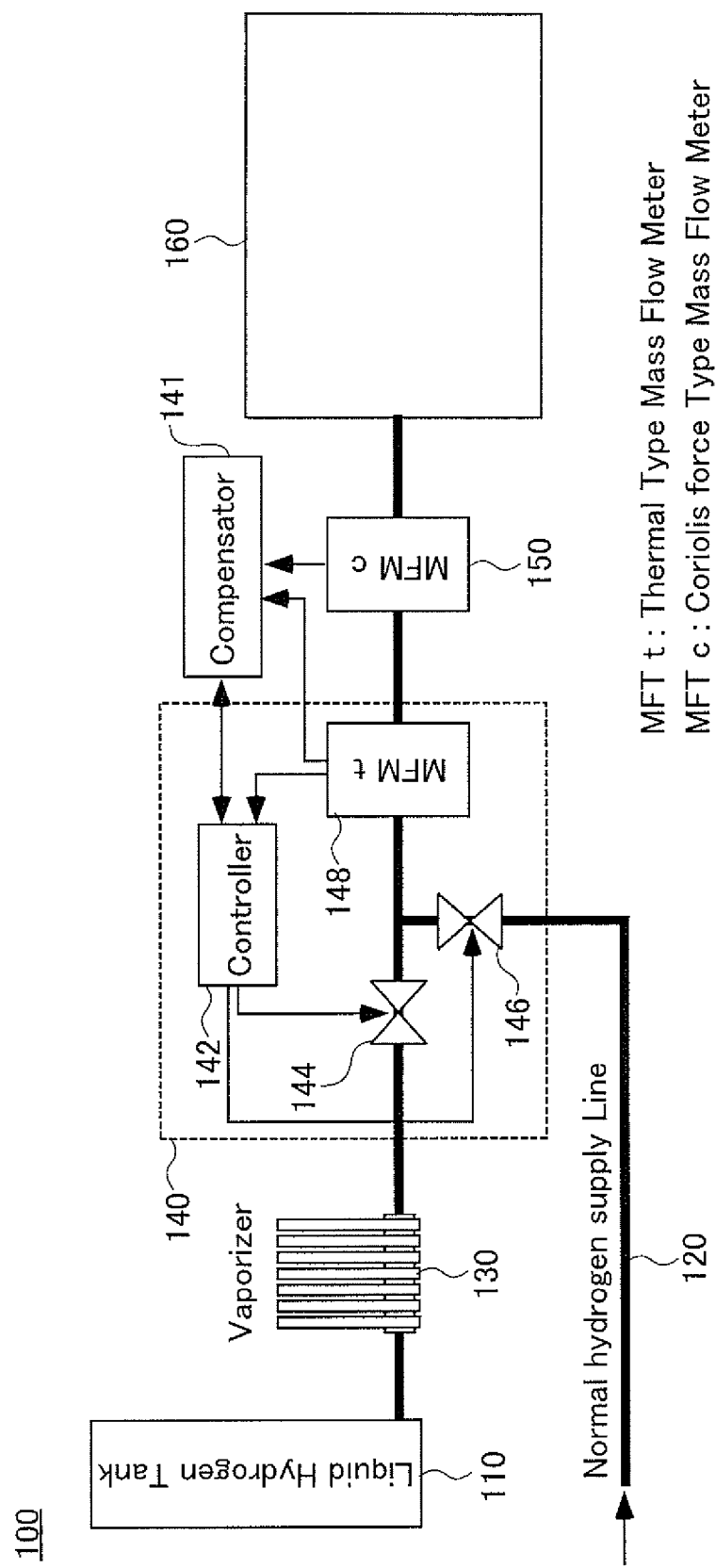
FIG. 1 is a schematic view illustrating how hydrogen is supplied.

FIG. 1 schematically illustrates the structure of supply equipment 100 that supplies a hydrogen gas to manufacturing equipment 160 of optical fiber base materials. The supply equipment 100 has two hydrogen gas supply paths, one of which supplies a hydrogen gas from a liquid hydrogen tank 110 that stores therein liquid hydrogen via a vaporizer 130 and the other is a normal hydrogen supply line 120 that supplies a hydrogen gas that is stored at ordinary temperatures.

The liquid hydrogen tank 110 is provided with cooling equipment so as to store the liquid hydrogen at a low temperature. The vaporizer 130 heats the liquid hydrogen to produce a hydrogen gas.

The two hydrogen gas supply systems join together after respectively going through valves 144 and 146. The resulting hydrogen gas is supplied to the manufacturing equipment 160 via a thermal type mass flow meter 148 and a Coriolis force type mass flow meter 150.

The valves 144 and 146 open and close under the control of a controller 142 and respectively supply, to the manufacturing equipment 160, the hydrogen gas that originates from the liquid hydrogen and the hydrogen gas that is stored in the gaseous state. The valves 144 and 146 supply the hydrogen gas to the manufacturing equipment 160 at a flow rate that is set at the controller 142 in response to a request from the manufacturing equipment 160.

The thermal type mass flow meter 148 has a pair of temperature sensors that are positioned upstream and downstream relative to each other in the flow of the hydrogen gas and detects a difference in temperature caused by the hydrogen gas flow. The detected difference in temperature can vary as a function of the mass flow rate of the hydrogen gas. Thus, the thermal type mass flow meter 148 can measure the flow rate of the hydrogen gas without the influence of the temperature and pressure.

The controller 142 opens and closes the valves 144 and 146 depending on the measured value of the hydrogen gas flow rate. In other words, the controller 142, the valves 144 and 146, and the thermal type mass flow meter ($MFM_T$) 148 together form a thermal type mass flow controller 140 for the manufacturing equipment 160.

On the other hand, a Coriolis force type mass flow meter ($MFM_C$) 150 is arranged in series with the thermal type mass flow meter 148 and is designed to measure the hydrogen gas flow rate. The Coriolis force type mass flow meter 150 has a U-shaped tube that passes the hydrogen gas therethrough. When the hydrogen gas flows through the U-shaped tube, the Coriolis force type mass flow meter 150 measures a time interval between when deformation occurs at one of the ends of the U-shaped tube by Coriolis force and when deformation occurs at the other end so as to detect the mass flow rate of the hydrogen gas. Since the Coriolis force type mass flow meter 150 detects the flow rate based on the above-described principle, its measured value is not affected by variation in the specific heat of the hydrogen gas, whose mass flow rate is expected to be detected.

A compensator 141 receives the measured value obtained by the thermal type mass flow meter ($MFM_T$) 148, the measured value obtained by the Coriolis force type mass flow meter 150, and a hydrogen gas flow rate set value $f_{H\_Set}$ input into the controller 142. How the compensator 141 operates in response to the reception of these values will be described later.

As described above, the supply equipment 100 utilizes the thermal type mass flow meter 148, which serves as a first flow rate measuring section, and the Coriolis force type mass flow meter 150, which serves as a second flow rate measuring section, where the both flow meters are connected in series to each other, for the purpose of controlling the flow rate of the hydrogen gas to be supplied to the manufacturing equipment 160. The supply equipment 100 with such a configuration is utilized, for example, in such a manner that, while the line for supplying the hydrogen manufactured at ordinary temperatures is routinely used, the hydrogen gas originating from liquid hydrogen is supplied as a backup. In this way, the supply equipment 100 can continuously supply a hydrogen gas for a long time.

The manufacturing equipment 160 may include a plurality of manufacturing facilities. More specifically, the manufacturing equipment 160 may include both a facility for manufacturing the core and cladding of optical fiber base materials by means of the VAD method and a facility for manufacturing additional cladding by means of the OVD method. In this manner, the manufacturing equipment 160 can undergo all of the steps of the optical fiber base material manufacturing method.

Although the above-described embodiment uses a Coriolis force type mass flowmeter as the second flow rate measuring section, any other sensor can be used provided that it can measure the flow rate without being affected by the heat capacity and thus measures the flow rate based on measurement of a parameter other than the heat capacity.

Figure 2:
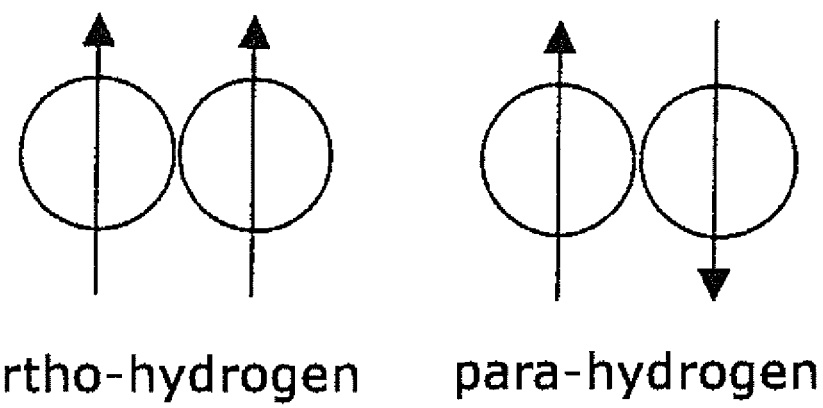
FIG. 2 is a schematic view illustrating the spin states of a hydrogen molecule.

FIG. 2 schematically illustrates the nuclear spins of the hydrogen molecules forming a hydrogen gas. As shown in FIG. 2, the hydrogen molecules are classified into two types of isomers that differ from each other in terms of the nuclear spin directions. More specifically, a diatomic hydrogen molecule includes two protons. Hydrogen molecules having two protons spinning in the same direction are referred to as ortho-hydrogen, and hydrogen molecules having two protons spinning in opposite directions are referred to as para-hydrogen.

Figure 3:
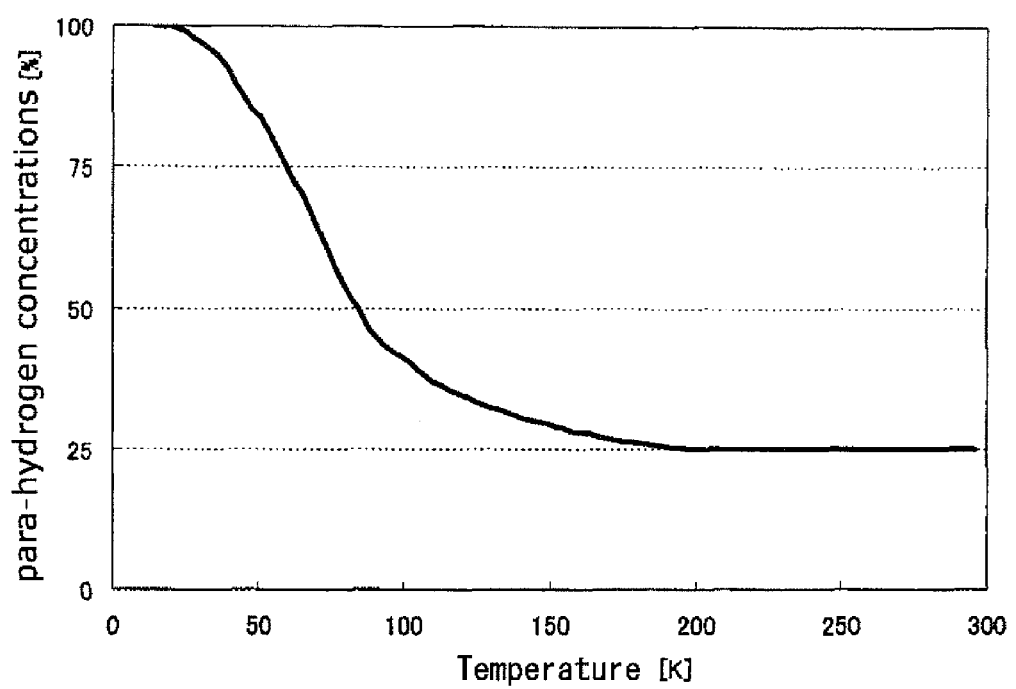
FIG. 3 is a graph illustrating the relation between the concentration of a para-hydrogen and a temperature.

FIG. 3 is a graph illustrating the concentration of para-hydrogen to establish the equilibrium state at each temperature of a hydrogen gas. The vertical axis of the graph is indicative of the concentration of the para-hydrogen (%) and the horizontal axis is indicative of the temperature (K).

When ortho-hydrogen and para-hydrogen are in equilibrium at ordinary temperatures equal to or higher than 200K, the content ratio between ortho-hydrogen and para-hydrogen is approximately 3:1. When ortho-hydrogen and para-hydrogen are in equilibrium at a temperature near the boiling point of liquid hydrogen (20K), para-hydrogen substantially dominates. A hydrogen gas containing ortho-hydrogen and para-hydrogen at such a ratio that equilibrium is established is referred to as normal hydrogen.

The conversion from ortho-hydrogen to para-hydrogen is a slow reaction and generates heat. Therefore, if hydrogen at ordinary temperatures is processed into liquid hydrogen without changing the ratio between ortho-hydrogen and para-hydrogen, the ortho-hydrogen is converted into para-hydrogen within the low-temperature tank, which generates heat and consequently vaporizes a large amount of the liquid hydrogen. In order to prevent this reaction from occurring and stably preserve liquid hydrogen, the ortho-to-para conversion is accelerated during the process of liquefying the hydrogen so that para-hydrogen substantially dominates in the resulting liquid hydrogen.

When such liquid hydrogen in which para-hydrogen substantially dominates is vaporized by the vaporizer 130, however, the resulting hydrogen gas is out of equilibrium due to a short period of time from the low-temperature storage to the vaporization. The metal pipe for transportation of the liquid hydrogen provides catalyst action to convert para-hydrogen into ortho-hydrogen, but complete conversion is not guaranteed by a pipe of only several hundred meters. Therefore, the hydrogen gas originating from the liquid hydrogen has a higher concentration of para-hydrogen than normal hydrogen does. Here, the hydrogen that is manufactured or preserved at ordinary temperatures has substantially the same concentration of para-hydrogen as normal hydrogen does and thus is in equilibrium.

Ortho-hydrogen and para-hydrogen exhibit different properties. For example, the constant pressure specific heat at 0 degrees Celsius is 30.35 [J/(mol*K)] for para-hydrogen but 28.59 [J/(mol*K)] for normal hydrogen. Therefore, the thermal type mass flow meter 148, which is calibrated assuming that normal hydrogen is supplied, reads differently depending on the constant pressure specific heat.

The supply equipment 100 shown in FIG. 1, however, includes the Coriolis force type mass flow meter 150, whose measurement is not based on the measurement of the heat capacity. Therefore, the measured value provided by the thermal type mass flow meter 148 can be compensated by multiplying the hydrogen gas flow rate set value set at the controller 142 by the ratio (R) between the measured value provided by the thermal type mass flow meter 148 and the measured value provided by the Coriolis force type mass flow meter 150.

Specifically speaking, in the supply equipment 100, when the measurement value provided by the thermal type mass flow meter 148 is 1.01 times as large as the measured value obtained by the Coriolis force type mass flow meter 150 (when R=1.01), the compensator 141 compensates the hydrogen gas flow rate set value $f_H$ by multiplying the set value $f_H$ by 1.01 ($f_{H\_Set}=f_H\times1.01$) and gives the compensated set value $f_{H\_Set}$ to the controller 142. In this manner, the mass flow rate of the hydrogen gas supplied to the manufacturing equipment 160 remains the same irrespective of the origin of the hydrogen gas.

When the measured value provided by the thermal type mass flow meter 148 is denoted by $F_T$ and the measured value provided by the Coriolis force type mass flow meter 150 is denoted by $F_c$, the ratio R is represented as follows.

$$R=F_T/F_C$$

When the hydrogen flow rate set value (the originally desired hydrogen flow rate) is denoted by $f_H$ and the flow rate set at the controller 142 is denoted by $f_{H\_Set}$, the relation between $f_H$ and $f_{H\_Set}$ is represented as follows.

$$f_{H\_Set}=f_H\times R$$

With the above-described configuration, the supply equipment 100 can accurately control the flow rate of the hydrogen gas to be supplied to the manufacturing equipment 160 irrespective of which one is supplied from among the hydrogen that is manufactured or preserved at ordinary temperatures, the backup hydrogen that is obtained by vaporizing the liquid hydrogen preserved in the low-temperature tank, and a mixture of both. Also, the supply equipment 100 can be provided by utilizing a commonly available thermal type mass flow controller.

Figure 4:
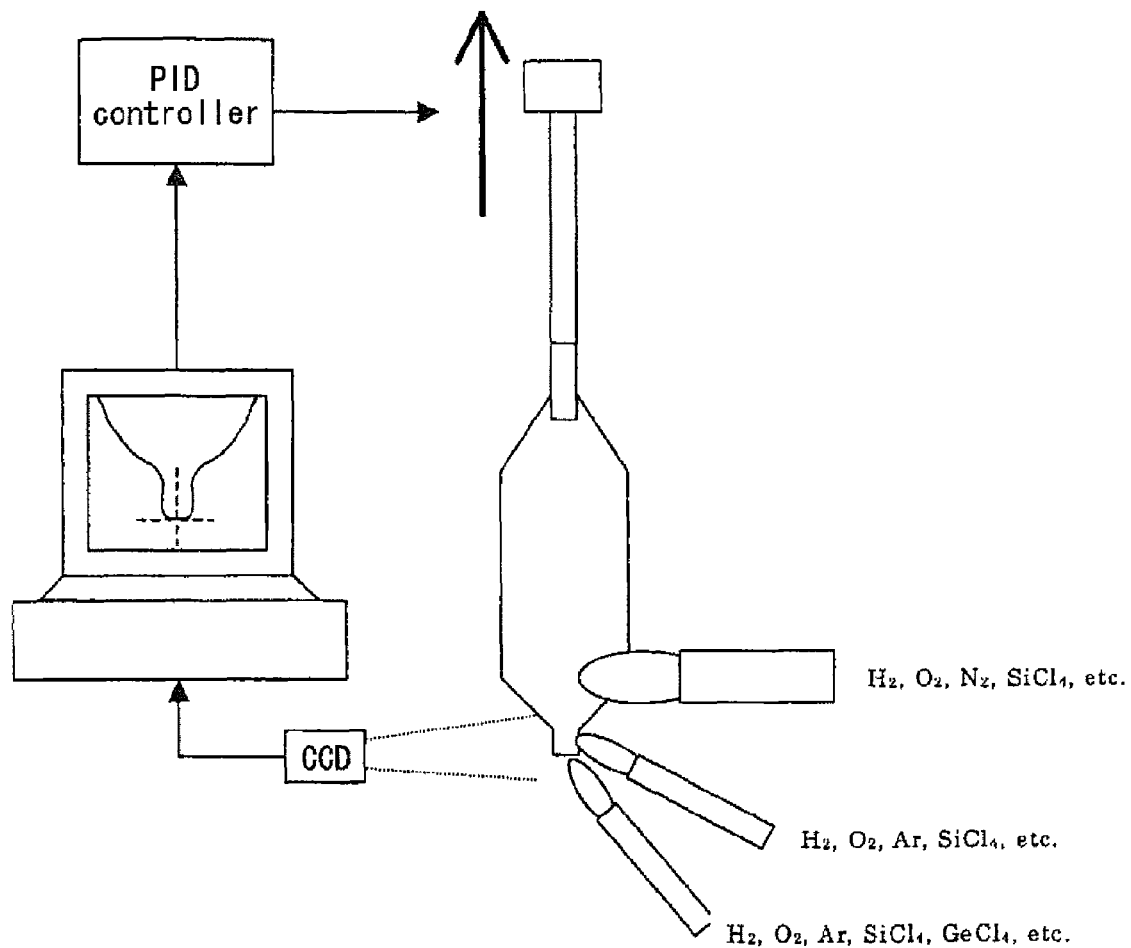
FIG. 4 is a schematic view illustrating the VAD method.

FIG. 4 schematically illustrates the structure of a VAD apparatus 200 included in the manufacturing equipment 160. The VAD apparatus 200 includes a PID controller 210, a processing device 220, a CCD camera 230, a group of burners 240, and a lifting device 270. The VAD apparatus 200 manufactures optical fiber base materials based on the VAD method.

The lifting device 270 hangs a starting material 262 by means of a rod 260. The CCD camera 230 captures images of the lower end of the starting material 262 and causes a display 222 of the processing device 220 to display the captured images. The processing device 220 identifies the position of the lower end of the starting material 262 based on the images captured by the CCD camera 230 and sends the identified position to the PID controller 210.

The group of burners 240 includes a core deposition burner 242 and cladding deposition burners 244 and 246. The core deposition burner 242 and cladding deposition burners 244 and 246 are each supplied with hydrogen whose flow rate is controlled by the thermal type mass flow controller 140, oxygen, an inert gas, and vaporized $SiCl_4$ as a raw material. When supplied to an oxyhydrogen flame, $SiCl_4$ is hydrolyzed into $SiO_2$.

The core deposition burner 242 is also supplied with $GeCl_4$ in addition to $SiCl_4$. $GeCl_4$ is converted by flame hydrolysis into $GeO_2$, which is added to a final product, that is, quartz glass in order to increase the refractive index. By limiting the supply of $GeCl_4$ to the core deposition burner 242, only the refractive index of the core is increased.

The PID controller 210 controls the lifting device 270 to lift and lower the starting material 262 so that the oxyhydrogen flame generated by the group of burners 240 is applied to the lower end of the starting material 262, with reference to the position of the starting material 250 obtained from the processing device 220.

$SiO_2$ that is generated by the group of burners 240 is deposited onto the end of the starting material 262, which is lifted while being rotated. Thus, a soot deposit 250 is formed. The end of the soot deposit 250 is also monitored by the CCD camera 230.

The PID controller 210 obtains the images captured by the CCD camera 230 via the processing device 220, and adjusts the lifting speed of the soot deposit 250 so that the lower end of the soot deposit 250 remains at the same position as the deposition process advances.

The optical fiber base material manufactured in the above-described manner has a core whose diameter is dependent on the flow rate of the hydrogen gas supplied to the core deposition burner 242. Also, the lifting speed of the soot deposit 250 that is controlled by the PID controller 210 is dependent on the flow rates of the hydrogen gas and $SiCl_4$ supplied to the core deposition burner 242.

Figure 5:
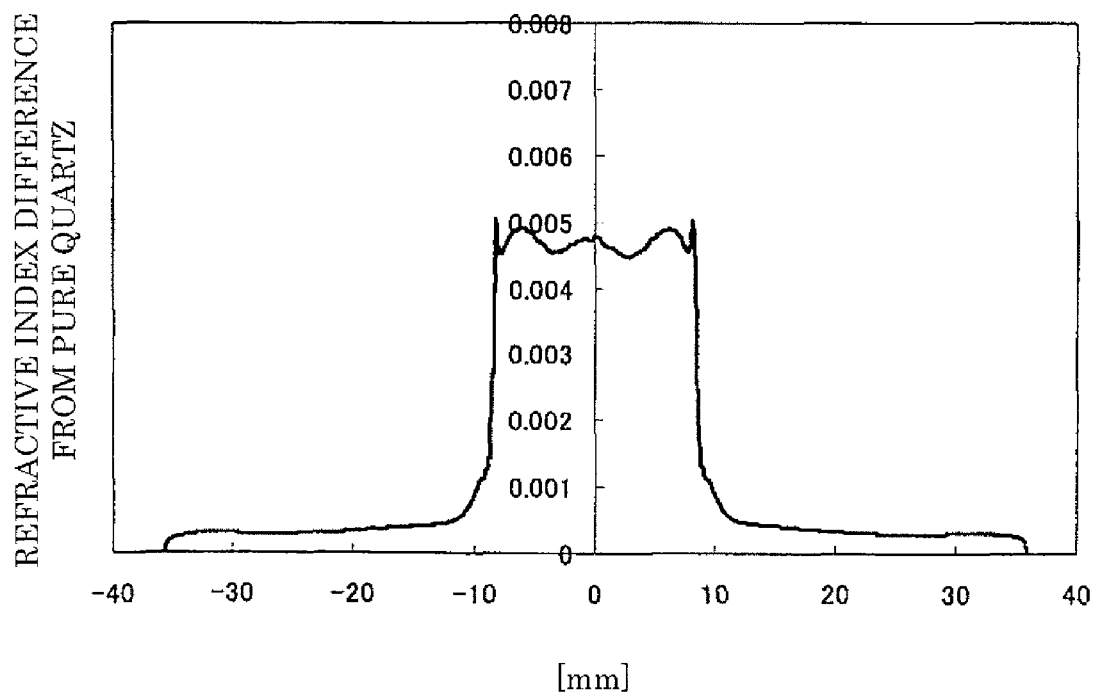
FIG. 5 illustrates a refractive index distribution of an optical fiber base material.

FIG. 5 is a schematic view illustrating the refractive index distribution of the optical fiber base material manufactured by means of the VAD method. The vertical axis represents the refractive index difference and the horizontal axis represents the position in a preform in its radiation direction. As described with reference to FIG. 4, the VAD method manufactures an optical fiber base material whose refractive index distribution is sufficient to achieve an functional optical fiber.

An optical fiber base material is required to have a stable refractive index distribution in its longitudinal direction. Any variation in the refractive index distribution results in variation in the characteristics of an optical fiber, which has significant influence on signal transmission. To address this issue, the present embodiment obtains the hydrogen flow rate ratio R between the flow rate measured by the thermal type mass flow meter ($MFM_T$) 148 and the flow rate measured by the Coriolis force type mass flow meter ($MFM_C$) 150, and multiplies the hydrogen flow rate set value, which is set by the manufacturing equipment 160 using the hydrogen gas, by the hydrogen flow rate ratio R. In this manner, the present embodiment can prevent the actual hydrogen flow rate from varying when the hydrogen gas supplied to the manufacturing equipment 160 is switched from the hydrogen that is manufactured at ordinary temperatures to the hydrogen that is obtained by vaporizing liquid hydrogen.

Figure 6:
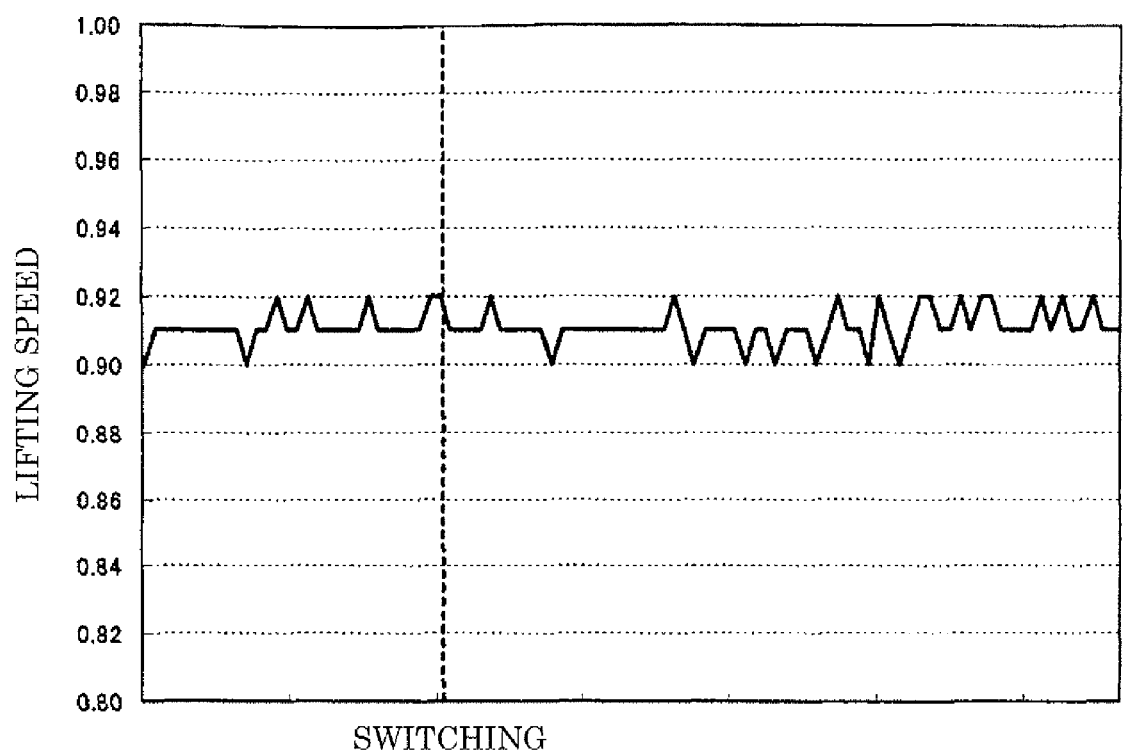
FIG. 6 is a graph illustrating a change in a lifting speed.

FIG. 6 is a graph illustrating the variation in the lifting speed during the optical fiber base material manufacturing process by the above-described manufacturing equipment 160. Specifically speaking, the graph shows the variation in the lifting speed when the hydrogen gas supplied to the VAD apparatus 200 is switched from the hydrogen manufactured at ordinary temperatures to the hydrogen obtained by vaporizing liquid hydrogen. In FIG. 6, the vertical axis is indicative of the lifting speed of the soot deposit (mm/min) and the horizontal axis is indicative of the time (the graduation is 2.4 hours and the time elapses from left to right).

As seen from the graph in FIG. 6, the lifting speed does not significantly vary before and after the switching of the hydrogen gas supplied. Furthermore, the manufactured optical fiber base material is found to have stable characteristics in its longitudinal direction.

Figure 7:
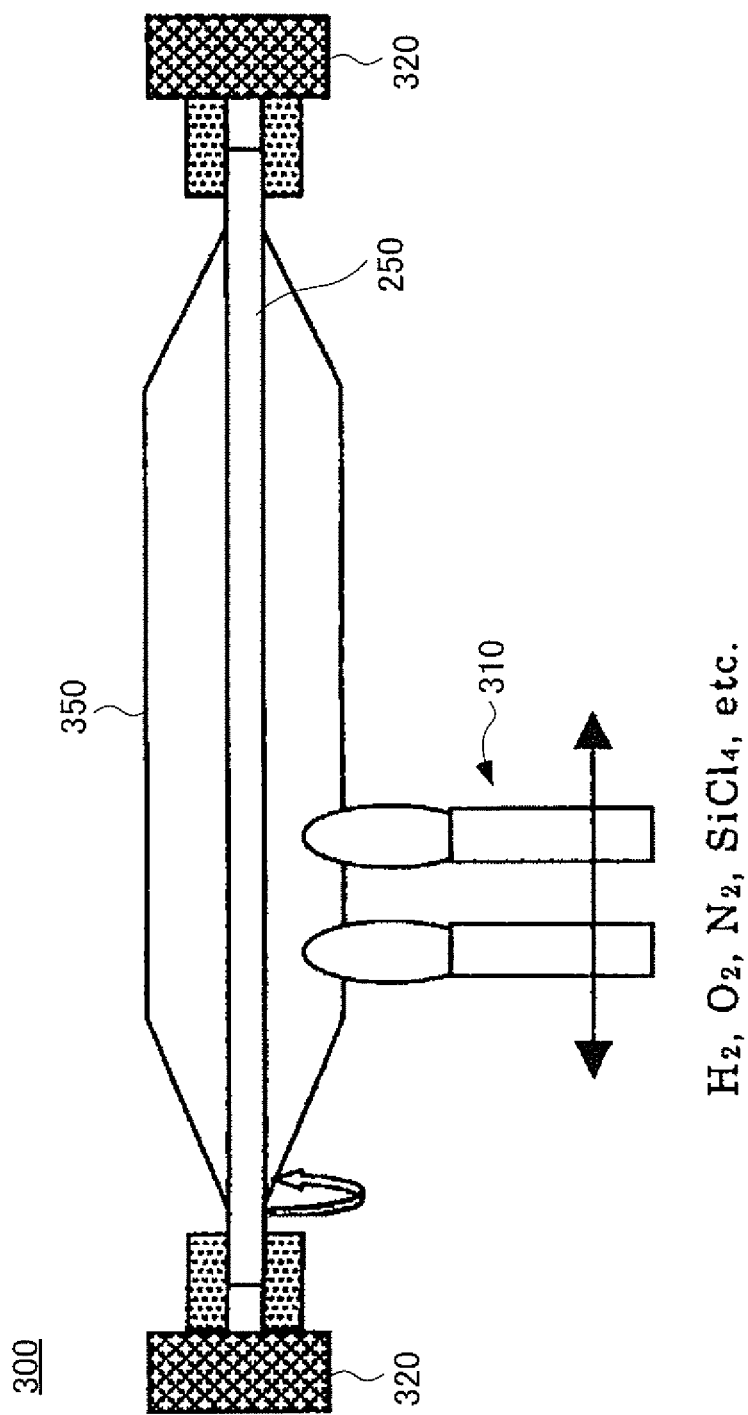
FIG. 7 is a schematic view illustrating the OVD method.

FIG. 7 schematically illustrates the structure of an OVD apparatus 300 included in the manufacturing apparatus 160. The OVD apparatus 300 includes a group of burners 310 and a driving device 320.

The driving device 320 horizontally supports the respective ends of the soot deposit 250, which constitutes part of the core and cladding, and moves the soot deposit 250 in its longitudinal direction while rotating the soot deposit 250 with the rotation axis being the soot deposit 250 itself. The group of burners 310 includes a plurality of cladding deposition burners. Each cladding deposition burner is supplied with the hydrogen whose flow rate is controlled by the thermal type mass flow controller 140, oxygen, an inert gas, a material gas, and the like. The group of burners 310 generates $SiO_2$, which is deposited onto the soot deposit 250 to form an optical fiber base material 350.

The optical fiber base material 350 is heated to a high temperature of approximately 1,500 degrees Celsius in a different heating furnace, to be processed into transparent quartz glass. The atmosphere in this heating furnace is often a helium atmosphere in order to prevent air bubbles from remaining in the resulting glass. If necessary, the optical fiber base material 350 is heated to a temperature of between approximately 1,000 degrees Celsius and 1,200 degrees Celsius in a chlorine containing atmosphere for dehydration before processed into the transparent glass.

The OVD apparatus 300 also performs the above-described compensation by multiplying the hydrogen flow rate set value $f_H$ given by the equipment that utilizes the hydrogen by the hydrogen gas flow rate ratio R when the hydrogen is switched. In this case, there is no difference observed in the density of the manufactured porous base material between when the hydrogen manufactured at ordinary temperatures is used and when the hydrogen obtained by vaporizing liquid hydrogen is used. When the same compensation is performed for a mixture produced by adding to the hydrogen manufactured at ordinary temperatures the hydrogen obtained by vaporizing liquid hydrogen at a percentage ranging from 0 to 100%, no abnormalities are found during the manufacturing process despite the variation in the percentage of the hydrogen obtained by vaporizing liquid hydrogen, and the manufactured porous base material does not have a significant variation in characteristics.

First Comparative Example

The supply equipment 100 and the manufacturing equipment 160 of the above-described embodiment were used to manufacture an optical fiber base material. Note that, however, the Coriolis force type mass flow meter 150 was used to measure the flow rate of the hydrogen gas, and the control technique of multiplying the hydrogen flow rate set value $f_H$ set at the controller 142 by the flow rate ratio R was not employed.

Figure 8:
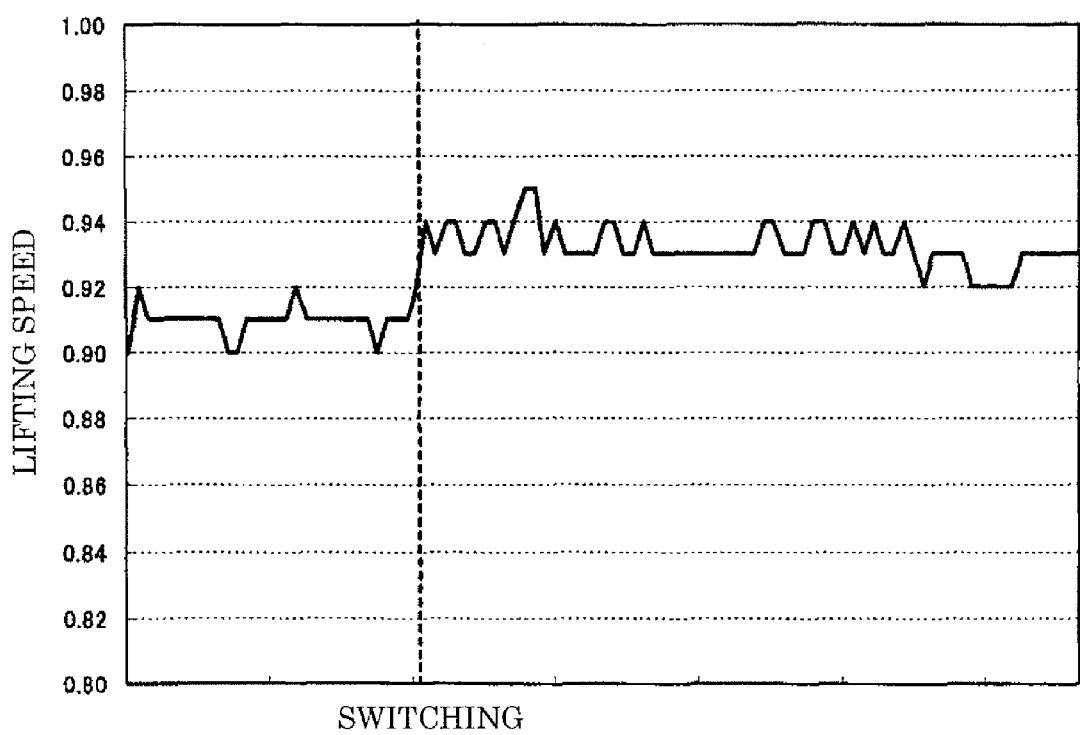
FIG. 8 is a graph illustrating a change in a lifting speed.

FIG. 8 is a graph illustrating the variation in the lifting speed of the soot deposit 250 in the VAD apparatus 200 before and after the switching of the hydrogen gas to be supplied to the manufacturing equipment 160. As seen from the graph in FIG. 8, the lifting speed increased by 2% before and after the switching of the hydrogen gas in the manufacturing equipment 160 relating to the first comparative example.

Thus, since the switching of the hydrogen gas induced variations in the refractive index distribution, core diameter and cladding diameter, the soot deposit 250 could no longer be used as an optical fiber base material. In some cases, the soot deposit 250 even cracked. This is probably because the actual flow rate of the hydrogen gas suddenly changed and the density of the soot deposit 250 consequently sharply changed.

Furthermore, the OVD apparatus 300 also switched the hydrogen without compensating the thermal type mass flow controller 140 based on the reading of the Coriolis force type mass flow meter 150. In this case, the density of the resulting porous base material decreased by approximately 1.5% and the outer diameter of the manufactured porous base material increased. The increased outer diameter made it impossible to place some of the manufactured porous base materials into a heating furnace for a subsequent step, and such porous base materials could not be processed into transparent glass.

Second Comparative Example

The VAD apparatus 200 was used to manufacture optical fiber base materials. At the beginning, the VAD apparatus 200 used the hydrogen manufactured at ordinary temperatures and later switched to the hydrogen obtained by vaporizing liquid hydrogen. In this case, the lifting speed unexpectedly increased by approximately 2%. Examination of the resulting optical fiber base material revealed a decrease in the core diameter. These changes including the increased lifting speed and the varied core diameter were equivalently observed when the flow rate of the hydrogen was reduced by approximately 1% without changing the flow rate of SiCl₄.

Third Comparative Example

The OVD apparatus 300 was used to manufacture porous base materials. At the beginning, the OVD apparatus 300 used the hydrogen manufactured at ordinary temperatures and later switched to the hydrogen obtained by vaporizing liquid hydrogen. In this case, the manufactured porous base material showed a decrease in density. This change was also equivalently observed when the flow rate of the hydrogen was reduced. It should be noted that the pressure and temperature of the hydrogen observed at the time of being supplied to the thermal type mass flow controller 140 remained at substantially the same level before and after the switching. Furthermore, there were no significant differences which could induce the above-mentioned change in the level of purity and in the concentration of impurities between the hydrogen manufactured at ordinary temperatures and the liquid hydrogen.

As another example, the hydrogen gas manufactured at ordinary temperatures was used at the beginning and a mixture produced by mixing together the hydrogen manufactured at ordinary temperatures and the hydrogen obtained by vaporizing liquid hydrogen with the ratio of 1:1 was later used, assuming a case where the supply of the hydrogen manufactured at ordinary temperatures was partly stopped and the backup hydrogen originating from liquid hydrogen was added to supply a necessary amount of hydrogen. The lifting speed of the VAD apparatus 200 changed by approximately 1%, which change was equivalently observed when the flow rate of the hydrogen was reduced by approximately 0.5%.

In light of the above, when the thermal type mass flow controller 140, which employs a normal hydrogen conversion factor, is used to control hydrogen that has a higher concentration of para-hydrogen than normal hydrogen, the actual flow rate decreases by 0% to 6% depending on the concentration of the para-hydrogen in comparison with the flow rate of the normal hydrogen. For example, when a hydrogen gas containing approximately 37% of para-hydrogen is supplied, the actual flow rate decreases by approximately 1%. It has been found that a change of 0% to 6% in the actual flow rate of hydrogen significantly affects the characteristics of manufactured products and increases defective products.

As described above, the hydrogen gas flow rate set value $f_H$ is compensated by utilizing the combination of the thermal type mass flow controller 140 and the Coriolis force type mass flow meter 150 in accordance with the present embodiment. With such a configuration, the VAD method can manufacture quartz glass optical fiber performs with stable characteristics even when the hydrogen used for manufacturing quartz glass optical fiber base materials is switched to or additionally includes the hydrogen obtained by vaporizing liquid hydrogen. With such a configuration, the OVD method can similarly manufacture quartz glass without defects resulting from a change in the density.

Although some aspects of the present invention have been described by way of exemplary embodiments, it should be understood that those skilled in the art might make many changes and substitutions without departing from the spirit and the scope of the present invention which is defined only by the appended claims.

The claims, specification and drawings describe the processes of an apparatus, a system, a program and a method by using the terms such as operations, procedures, steps and stages. When a reference is made to the execution order of the processes, wording such as "before" or "prior to" is not explicitly used. The processes may be performed in any order unless an output of a particular process is used by the following process. In the claims, specification and drawings, a flow of operations may be explained by using the terms such as "first" and "next" for the sake of convenience. This, however, does not necessarily indicate that the operations should be performed in the explained order.

What is claimed is:

1. An apparatus for supplying a hydrogen gas to a quartz glass manufacturing apparatus including a burner that generates an oxyhydrogen flame when supplied with the hydrogen gas, the apparatus comprising:
   a first hydrogen supply system that supplies a hydrogen gas in which isomers are in equilibrium;
   a second hydrogen supply system that supplies a hydrogen gas in which isomers are out of equilibrium;
   a flow rate control section that includes:
      a valve that changes a flow rate of the hydrogen gas to be supplied to the burner;
      a first flow rate measuring section, disposed downstream of the valve, that measures the flow rate of the hydrogen gas to be supplied to the burner by measuring a heat capacity; and
      a control section that controls the valve in such a manner that a measured value obtained by the first flow rate measuring section approaches a set value input from outside;
   a second flow rate measuring section, connected in series with the first flow rate measuring section, that measures the flow rate of the hydrogen gas to be supplied to the burner by measuring a different factor than the heat capacity; and
   a set value compensating section that compensates the set value by multiplying the set value by a ratio between the measured value obtained by the first flow rate measuring section and a measured value obtained by the second flow rate measuring section.

2. The apparatus as set forth in claim 1, wherein
   the flow rate control section is a thermal type mass flow controller that includes temperature sensors that are arranged along a flow of the hydrogen gas.

3. The apparatus as set forth in claim 2, wherein
   the first flow rate measuring section is a thermal type mass flow meter.

4. The apparatus as set forth in claim 1, wherein
   the second flow rate measuring section is a Coriolis force type mass flow meter.

5. The apparatus as set forth in one of claims 1 to 4, further comprising the quartz glass manufacturing apparatus.

6. A system comprising:
   a quartz glass manufacturing apparatus including a burner that generates an oxyhydrogen flame when supplied with hydrogen gas; and
   an apparatus for supplying the hydrogen gas to the quartz glass manufacturing apparatus, the apparatus for supplying the hydrogen gas comprising:
   a first hydrogen supply system that supplies a hydrogen gas in which isomers are in equilibrium;
   a second hydrogen supply system that supplies a hydrogen gas in which isomers are out of equilibrium;

a flow rate control section that includes:
- a valve that changes a flow rate of the hydrogen gas to be supplied to the burner;
- a first flow rate measuring section, disposed downstream of the valve, that measures the flow rate of the hydrogen gas to be supplied to the burner by measuring a heat capacity; and
- a control section that controls the valve in such a manner that a measured value obtained by the first flow rate measuring section approaches a set value input from outside;

a second flow rate measuring section, connected in series with the first flow rate measuring section, that measures the flow rate of the hydrogen gas to be supplied to the burner by measuring a different factor than the heat capacity; and a set value compensating section that compensates the set value by multiplying the set value by a ratio between the measured value obtained by the first flow rate measuring section and a measured value obtained by the second flow rate measuring section.

7. The system as set forth in claim 6, wherein
the flow rate control section is a thermal type mass flow controller that includes temperature sensors that are arranged along a flow of the hydrogen gas.

8. The system as set forth in claim 7, wherein
the first flow rate measuring section is a thermal type mass flow meter.

9. The system as set forth in claim 6, wherein
the second flow rate measuring section is a Coriolis force type mass flow meter.

* * * * *